United States Patent
Petkov et al.

(10) Patent No.: US 11,984,918 B2
(45) Date of Patent: May 14, 2024

(54) METHOD FOR DETECTING THE SURROUNDINGS OF A NODE CAPABLE OF UNIDIRECTIONAL OR BIDIRECTIONAL RADIO COMMUNICATION AND NODE

(71) Applicant: Diehl Metering Systems GmbH, Nuremberg (DE)

(72) Inventors: Hristo Petkov, Nuremberg (DE); Christoph Schmidt, Nuremberg (DE); Thomas Kauppert, Nuremberg (DE); Klaus Gottschalk, Winkelhaid (DE); Simon Schroeter, Erlangen (DE); Benjamin Meyer, Nuremberg (DE)

(73) Assignee: Diehl Metering Systems GmbH, Nuremberg (DE)

( * ) Notice: Subject to any disclaimer, the term of this patent is extended or adjusted under 35 U.S.C. 154(b) by 79 days.

(21) Appl. No.: 17/580,067

(22) Filed: Jan. 20, 2022

(65) Prior Publication Data
US 2022/0247440 A1    Aug. 4, 2022

(30) Foreign Application Priority Data
Feb. 1, 2021   (DE) .......................... 102021102216.9

(51) Int. Cl.
*H04B 1/12*    (2006.01)

(52) U.S. Cl.
CPC .................... *H04B 1/123* (2013.01)

(58) Field of Classification Search
CPC ..................................... H04B 1/123
See application file for complete search history.

(56) References Cited

U.S. PATENT DOCUMENTS

| | | | | |
|---|---|---|---|---|
| 2,033,390 | A * | 3/1936 | Moser | H01Q 21/06 342/368 |
| 2002/0132596 | A1* | 9/2002 | Kim | H04B 1/04 455/69 |
| 2006/0245474 | A1* | 11/2006 | Brunel | H04B 1/707 375/350 |
| 2014/0323039 | A1* | 10/2014 | Hong | H04M 1/6091 455/39 |
| 2015/0103707 | A1* | 4/2015 | Panta | H04L 69/22 370/311 |
| 2015/0178529 | A1 | 6/2015 | Theurer et al. | |
| 2018/0351257 | A1 | 12/2018 | Rokhsaz et al. | |
| 2020/0346787 | A1* | 11/2020 | Salmi | B33Y 80/00 |

(Continued)

FOREIGN PATENT DOCUMENTS

| | | |
|---|---|---|
| DE | 102016010045 A1 | 2/2018 |
| DE | 102019210920 A1 | 1/2021 |
| DE | 102021102204 A1 | 8/2022 |

(Continued)

*Primary Examiner* — Hsinchun Liao

(57) ABSTRACT

A method detects the surroundings of a node, in particular in the form of a sensor apparatus and/or actuator apparatus, of a communications network. The node is capable of unidirectional or bidirectional radio communication and has a radio module equipped with an antenna, a transmit path and/or receive path, and a power supply apparatus, which is preferably energy self-sufficient, in particular a battery. The surroundings are detected, preferably at repeated time intervals, on the basis of an estimate of the detuning of the antenna of the radio module.

19 Claims, 7 Drawing Sheets

(56) References Cited

U.S. PATENT DOCUMENTS

2022/0247436 A1  8/2022  Petkov et al.

FOREIGN PATENT DOCUMENTS

| DE | 102021102208 A1 | 8/2022 |
| GB | 682544 A | 11/1952 |
| JP | 2011139202 A | 7/2011 |
| KR | 101855428 B1 | 5/2018 |

* cited by examiner

FIG. 7
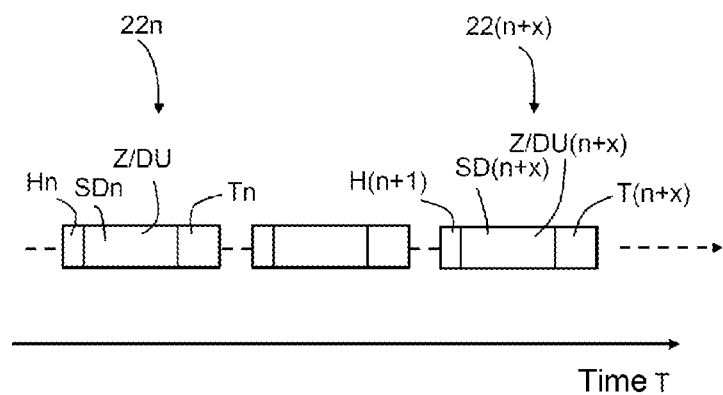
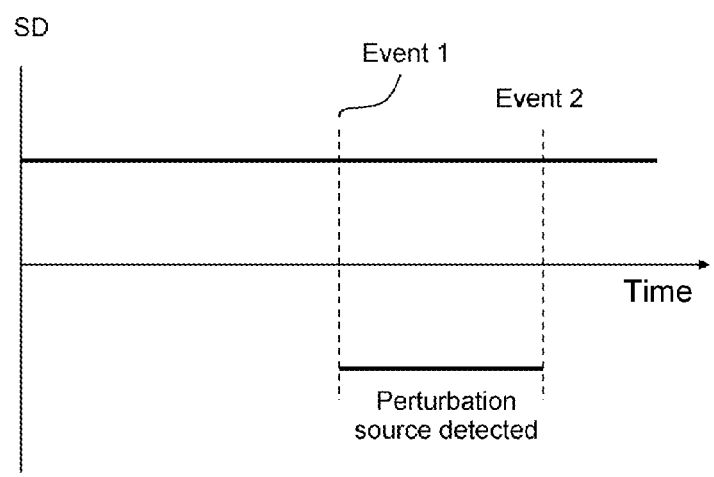
FIG. 8

METHOD FOR DETECTING THE SURROUNDINGS OF A NODE CAPABLE OF UNIDIRECTIONAL OR BIDIRECTIONAL RADIO COMMUNICATION AND NODE

CROSS-REFERENCE TO RELATED APPLICATION

This application claims the priority, under 35 U.S.C. § 119, of German Patent Application DE 10 2021 102 216.9, filed Feb. 1, 2021; the prior application is herewith incorporated by reference in its entirety.

FIELD AND BACKGROUND OF THE INVENTION

The present invention relates to a method according to the preamble of the independent method claim for detecting the surroundings, in particular the near surroundings, of a node, in particular of a sensor apparatus and/or actuator apparatus, which is capable of unidirectional or bidirectional radio communication. The present invention also relates to a node capable of radio communication and operated according to the present method. The node is preferably a node that is installed in a fixed position in a communications network.

The current trend in communications technology is to integrate more and more processors, communication modules and other electronic components into everyday objects. Even simple electrical devices for everyday use are meant to be equipped with a communications capability in the foreseeable future. It is hoped that this trend will create great opportunities for the economy and also for home life. Smart, or intelligent, objects are increasingly being equipped with information and communications technology and connected to cyberspace with its extensive services. This will give everyday objects a new amenity. Objects can use sensors to detect their surroundings, connect to each other, access Internet services, or even interact with people. Such sensors are intended to be used as "nodes" in what is called the IoT ("Internet of Things"). Actuators can act mechanically or electromagnetically on such objects or apply (electrical, preferably digital) control signals to these objects.

Such sensors or actuators are meant to be as compact as possible. Since a mains connection is often not available, they usually have to be operated in a self-sufficient manner by batteries over long periods of time or long service lives. For this reason, it must be possible to run the radio communication reliably with as little expenditure of energy as possible. In the radio module, this requires a high total sensitivity resulting from good resonant matching of the circuit to the antenna, which typically has narrowband dimensions.

At the same time, the demand for ever greater capacity for generating and sending data will result in greater energy consumption by the devices. Technology in the field of electrical energy storage is not keeping pace, however. Therefore, the expansion in functionality of the devices as a result of the "IoT" will cause problems in terms of the energy consumption this requires.

In the case of sensors, there is also an interest in ascertaining the situational or object surroundings of the sensors when analyzing the radio-transmitted measured variables specifically retrieved by the sensors. For example, it is possible that sensor apparatuses are not installed in the locations or housings that were originally planned. In addition, in the case of sensors, it is desirable to find out about certain situations, for instance tampering with permanently installed sensors (e.g., consumption meters) or shielding of sensors. For example, materials in the vicinity of an antenna of the sensor or actuator, for instance, can influence the antenna impedance, making flexible impedance matching desirable. Furthermore, temporary perturbation sources can arise. In this context, it is desirable to employ sensor technology at the sensors or actuators concerned. However, this in turn requires additional sensors and/or processors, which increase the energy consumption further.

Published, non-prosecuted German patent application DE 10 2016 010 045 A1 relates to a method for improving antenna matching in a smart meter in transmit mode. The antenna matching can be achieved by switching between resonant inductances or capacitances of different value. Each smart meter in a network transmits a plurality of test packets to a data collector using correspondingly different matching networks. The data collector assesses the test packets from all the smart meters in terms of their received field strength, selects the test packet that has the highest receive field strength, and feeds the selection back to the relevant smart meter. From then on, this transmits using the corresponding antenna matching. The disadvantage with this method is that a significant amount of electrical energy is consumed for emitting the radio signals, and also there is very high occupancy of the radio channel and hence sometimes it may even be blocked for a while. Furthermore, in a full channel, a perturbation source can distort the receive-strength measurement and therefore lead to an incorrect result.

British patent GB 682 544 describes an apparatus for measuring impedance for detecting changes in impedance of an antenna system fed with radiofrequency energy as part of an alarm or warning system. In this case, a distinction is drawn between slow and rapid changes in the impedance of the antenna. The aim of the idea described therein is to detect slow changes in the impedance caused by changes in the ambient temperature, in the humidity, in ageing of components or parts of the apparatus, and to adjust the impedance accordingly.

U.S. patent publication 2015/0178529 A1 describes a system and a method for detecting an event associated with a person relative to a bed. For this purpose, the bed contains an antenna and a tag-reader, which is in communication with the antenna and attached to the person. If a person is in the bed, a change in the impedance of the antenna is detected, and the tag-reader generates a presence signal. In response to detecting the tag within a threshold proximity of the tag reader, the tag reader generates a tag signal. A remote server analyses the tag signals to determine the time at which they appeared.

South Korean patent KR 101855428 describes a proximity sensor that works on the basis of an impedance change.

SUMMARY OF THE INVENTION

The object of the present invention is to provide a novel method for detecting the surroundings of a node capable of radio communication, which method can be run without any additional sensor technology. It is also an object of the present invention to provide a corresponding node capable of radio communication.

With regard to the method of the type in question, the present object is achieved by the features of the independent claim. The dependent claims contain expedient embodiments of the sensor apparatus according to the invention.

According to the invention, the surroundings of the node are detected on the basis of an estimate of the detuning of the antenna of the radio module of the node. Detection of the surroundings means in particular establishing whether or not an object is located in the vicinity of the node, preferably in its near-field, or whether or not the surroundings of the node have changed. This makes it possible to use the detuning of the antenna to detect whether or not an object causing perturbation is located in the range of the antenna. It can also be established by these means whether the node has been installed correctly or incorrectly. The method according to the invention also makes a detection method possible without an additional sensor. This has the advantage that the node can have very small dimensions (for instance nodes with a surface area of less than 30 cm$^2$). The fact that no additional sensors are needed means that there is also no need to use any additional microcontrollers, or more powerful microcontrollers, in the node, reducing not only the costs but also the energy consumption. The latter is particularly advantageous because it can conserve the self-sufficient power supply apparatus, which is a long-life battery, and hence can achieve a longer service life for the node. In addition, the antenna has a dual effect: the effect of transmitting/receiving radio signals, and the effect of detecting the surroundings.

The node can perform an estimate of the detuning of the antenna preferably successively or repeatedly in order to establish whether or not a change has taken place in the surroundings of the node.

The detuning of the antenna is expediently estimated on the basis of ascertaining the impedance, the signal-to-noise ratio (SNR), the received signal strength indicator (RSSI) and/or the noise figure in the receive path, preferably at the output, or after the output, of an input amplifier or of an LNA of the receive path, or from digital signals or data or I/Q data in the receive path.

In particular, the node can ascertain the impedance, the SNR, the RSSI and/or the noise figure in the receive path, preferably at the output, or after the output, of an input amplifier or LNA of the receive path, or from digital data or I/Q data in the receive path, and estimate on the basis thereof the detuning of the antenna on the basis of an approximation technique or best-fit technique.

Information (or measured values) relating to the impedance, SNR, RSSI and/or noise figure, or the data resulting or derived therefrom, can be sent out by the node via the radio module to a base station, preferably together with the payload or actual wanted data, for instance in a data packet or a datagram, and received and forwarded by the base station to a central station. This may be a data center, for instance in the form of a Cloud, for a multiplicity of nodes in the communications network.

In the data center or Cloud, the information (or measured values) or the resultant data, or the data derived therefrom, can be compared with each other and/or with stored data and/or combined with one another. It is also possible for empirical data to be stored there, in databases or compare registers, for comparing with the data originating from the individual nodes. This can be done in particular also for a plurality of nodes.

The estimate can preferably be performed in real time. Real time refers to an operation that runs in the real world substantially or practically simultaneously with associated processes.

In an expedient embodiment of the method according to the invention, empirical comparison data relating to information about the node, or data derived therefrom, is stored in advance in a compare register, preferably in the data center or Cloud, the estimated data determined during operation of the node, or data derived therefrom, is compared with the empirical comparison data from the compare register, and an object, or a situation in the surroundings, in the vicinity of the node is identified or at least classified on the basis of this comparison.

On the basis of the estimate, an object, or a situation in the surroundings, in the vicinity of the node can be identified or at least classified on the basis of the estimated data, or data derived therefrom.

An estimate can preferably be performed as part of adjusting the quality of the radio transmission between the node and the base station.

An estimate of the detuning of the antenna can be performed in particular by setting successively at the node a plurality of different matchings of the impedance, preferably by means of selectable matching circuits, by determining or estimating the impedance, the SNR, the RSSI and/or the noise figure for each of the different individual matchings of the impedance in the receive path, preferably at the output, or after the output, of an input amplifier or LNA of the receive path, or from digital signals or data or I/Q data in the receive path, and by comparing the values determined in this way. The node recognizes from the comparison whether detuning of the antenna has occurred as a result of an object in the surroundings of the node or as a result of an event that has occurred at the node.

It is advantageous if the estimate is performed on the basis of digital signals, in particular on the basis of I/Q data, which is diverted from the main data stream in the receive path, preferably by means of an interface or a switch. It is thereby possible to detect the surroundings particularly quickly.

The antenna of the node is in particular a narrowband antenna, preferably an antenna having a 3-dB bandwidth of less than 1 MHz.

The detection of the surroundings may preferably involve the following uses:
a) detecting parking-space occupancy, where the object causing the antenna detuning in particular is a vehicle;
b) tamper detection;
c) intrusion detection, where the object causing the antenna detuning in particular is an opened window or an opened door;
d) detecting the level in a container, where the object causing the antenna detuning in particular is the material being added or emptied; or
e) detecting incorrect installation.

The node may be a measuring device or sensor module, in particular a consumption meter, and/or an actuator.

The node can detect the surroundings continuously, for instance at certain times, in order to establish whether something has changed in its surroundings.

In order to detect the surroundings of the node, according to an expedient embodiment of the method according to the invention, a plurality of nodes can also send out the information or data they have each established relating to their antenna detuning, in order to draw conclusions about the surroundings of one or more nodes from this plurality of information items. For example, additional knowledge about the surroundings of one or more nodes can be obtained by said combining of information from nearby nodes.

The same applies to information or data relating to the detuning of different antennas present at the node (for instance for different ranges or frequency bands). Information or data resulting therefrom can also be used for detecting the surroundings. Alternatively, an object, or a situation in the surroundings, in the vicinity of the node can be identified or at least classified on the basis of the antenna detuning determined during operation of the node based on object-specific properties. For example, dielectrics (plastics) have the property of shifting the resonant frequency of the antenna in a particular way. Similarly, metal parts have an attenuating effect and influence the antenna impedance in a different way. It is therefore possible to identify or at least classify the object, or the situation in the surroundings, in the vicinity of the node on the basis of a different influence on the antenna impedance. Prior empirical measurement of a comparison object is not necessarily needed here.

Preferably in this case, the real part and/or imaginary part of the determined antenna impedance is evaluated. In the case of dielectrics (plastics), the resonant frequency of the antenna is shifted, thereby influencing the imaginary part of the antenna impedance given a fixed measurement frequency metal parts, in contrast, have an attenuating effect, and influence the antenna impedance by increasing the real part thereof. Hence by examining the real part and/or imaginary part of the impedance, it is possible to make an association via the link to a material classification.

It is also possible to deduce from the estimated impedance or change in impedance, the distance of the object from the node. The larger the measured quantitative effect of the object on the antenna impedance, the closer the object is located to the antenna. The size (magnitude) of the measured effect can therefore be used as measure of the distance of the object from the antenna. The antenna detuning or the impedance or change in impedance is established or estimated preferably as part of adjusting the quality of the radio transmission between the node and the base station. If this involves matching of the antenna impedance, it is possible in the process to perform effectively in parallel therewith, or simultaneously, near-field detection of the surroundings of the node.

The estimate of the antenna detuning is preferably performed in the receive mode of the node, thereby using significantly less energy. Hence the method according to the invention also makes a positive contribution to energy efficiency.

The node can estimate the antenna detuning by ascertaining the SNR ratio of receive signals arriving via the receive path of the radio module. Details of this method are described in the parallel published, non-prosecuted German patent application DE 102021102208.8, the contents of which are referenced in full. The antenna impedance can therefore be determined by comparing the SNR ratio for different matching networks for the impedance.

Alternatively or additionally, the antenna detuning can also be estimated according to the noise or noise figure of the receive path. The relevant method is described in published German patent application DE 102021102204.5, the contents of which are referenced in full. The antenna impedance can therefore likewise be determined by comparing the noise figure for different matching networks for the impedance.

Both aforementioned methods perform an estimate of the antenna impedance in the receive path without any prior sending of test packets, and are therefore particularly energy-efficient.

After the antenna detuning in the node has been estimated according to the present invention, the decision as to whether or not an event initiating the antenna detuning has taken place can be made by the node itself or in the data center or Cloud.

With regard to the energy self-sufficient power supply apparatus, in particular a battery, this expediently has a capacity of less than 10 Ah.

Using the method according to the invention, it is possible, for example, to establish whether the door of a consumption meter is closed or open, because a closed door results in a different distortion in the impedance of the antenna than an opened door. In the case of an opened door, for example, a notification and/or alarm can be signaled in the uplink signal. Likewise, intrusion information, meter tampering or detection of illegal shielding at the meter can be communicated in uplink information.

It is also possible to detect an incorrect installation, for instance when a meter is installed in an incorrect housing, or a meter has been installed on the wrong pipes (on metal pipes instead of plastic pipes or vice versa). The impedance of the antenna is different in each of these cases. By transmitting the impedance, change in impedance or impedance data derived therefrom, it is hence possible to check the installation and to output a warning to the fitter, preferably in real time. This allows the fitter to take immediate remedial action.

The present invention also relates to a node, in particular in the form of a sensor apparatus and/or actuator apparatus, for use in a communications network, which node is capable of radio communication and has a radio module equipped with an antenna and having a transmit and/or receive path, and has a power supply apparatus, which is preferably energy self-sufficient, in particular a battery, an impedance matching element and a microprocessor, wherein the microprocessor is configured such that the node can be operated in accordance with the method claims.

Other features which are considered as characteristic for the invention are set forth in the appended claims.

Although the invention is illustrated and described herein as embodied in a method for detecting the surroundings of a node capable of unidirectional or birectional radio communication, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

FIG. 7 is a highly simplified schematic diagram of a plurality of data packets as a sequence in time for an uplink transmission;

FIG. 8 is a highly simplified schematic diagram of detecting, for instance, a temporary perturbation source.

DETAILED DESCRIPTION OF THE INVENTION

Figure 1:
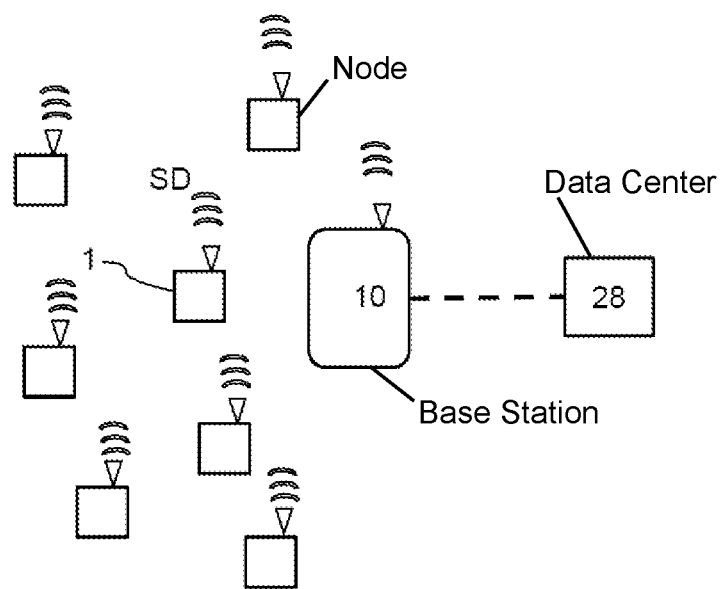
FIG. 1 is a highly simplified schematic diagram of an arrangement of a plurality of nodes, capable of bidirectional radio communication, in a communications network according to the invention.

Referring now to the figures of the drawings in detail and first, particularly to FIG. 1 thereof, there is shown Referring now to the figures of the drawings in detail and first, particularly to FIG. 1 thereof, there is shown FIG. 1 shows an arrangement of a plurality of nodes 1, for instance in the form of sensor apparatuses, capable of bidirectional radio communication. These transmit sensor data SD, for instance consumption data and/or other operating data, to a base station 10 or data collector, in which the data is conditioned and/or forwarded, for instance via the Internet, to a data center 28 or Cloud for further use.

A sensor apparatus can measure, for instance, a physical or chemical property E, for example the temperature of an object, the flow rate of a fluid or gas as part of a flow meter, or the electrical conductivity (for instance to measure a salt content). Alternatively, for instance, a sensor apparatus can determine by means of the reaction with reagents, the constituent materials B or, for example, a water quality. A color change indicates whether the water quality is good enough. Finally, a sensor apparatus may also produce measured variables relating to situational information I. Such sensor apparatuses can generally be used in implementing the "Internet of Things" (IoT).

The node 1 could also be in the form of an actuator apparatus if required. An actuator receives electrical signals and acts on an external object. Apart from the classical case of a mechanical effect (for instance by means of a rod operated by the actuator), there is also the option of an electromagnetic effect (when the actuator produces an electric or magnetic field that holds a ferromagnetic object in a certain position). Finally, the actuator may also cause a secondary reaction in the object by means of control signals, and act in a certain sense as a translator of signals, which it receives itself via radio, into electrical signals, which it forwards over a line.

Finally, a node 1 could combine properties both of a sensor apparatus of the type described above and also of an actuator apparatus of the type described above.

Figure 2:
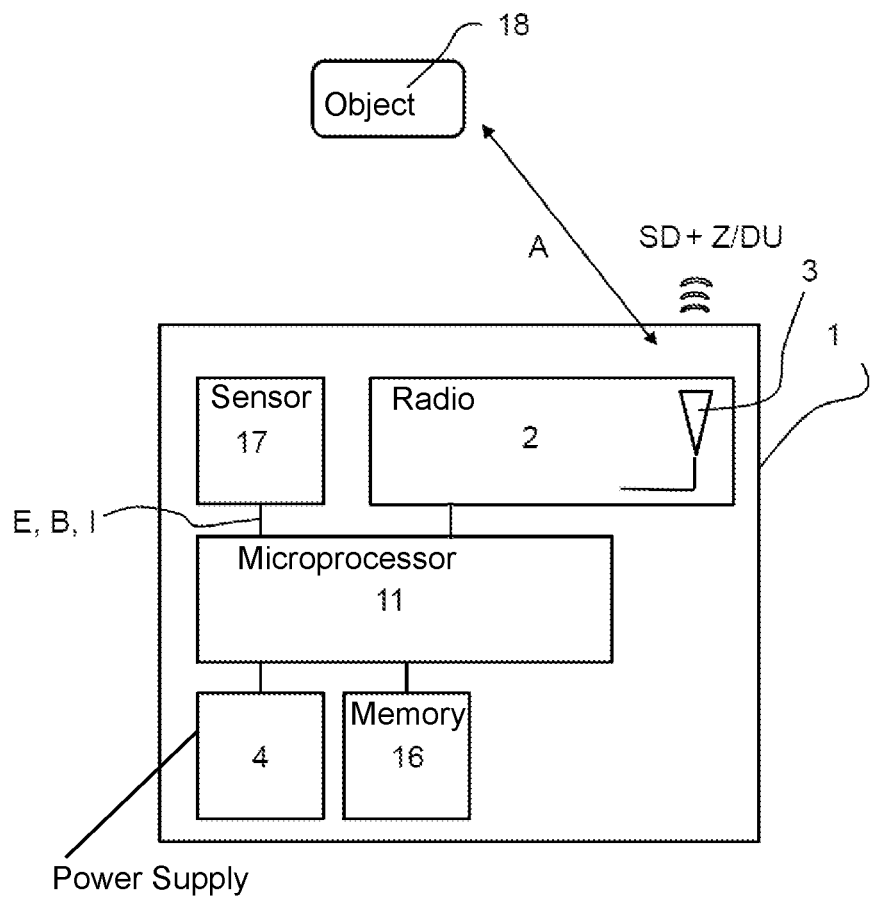
FIG. 2 is a highly simplified schematic diagram of an example of a node in the form of a sensor apparatus of the communications network of FIG. 1.

FIG. 2 is used to explain in greater detail an example of a design of a node 1 in the form of a sensor apparatus, although in principle this may also be identical or similar in the case of an actuator apparatus.

The sensor apparatus contains a power supply apparatus 4, in particular a battery, which is energy self-sufficient over a long period. This is configured in particular to supply the sensor apparatus with electrical power for years. The power supply apparatus preferably has a capacity of no more than 10 Ah in view of an energy-saving mode of operation.

In addition, a radio module 2 is provided, in which is integrated an antenna 3. The antenna 3 is necessarily narrowband because of the limited installation space. For example, the antenna has a 3-dB bandwidth of less than 1 MHz. The node 1 also contains a microprocessor 11, which can be provided as part of the radio module 2 or else separately therefrom. The microprocessor 11 contains a memory 16. In addition, the node 1 can comprise at least one sensor element 17, for instance a temperature sensor, piezoelectric transducer or the like, which is used to detect a physical or chemical property E, material constituents B or situational information I, and to output a corresponding measurement variable E, B.

Alternatively, the radio module 2 can also have a couplable external antenna (not shown in the drawing). Different antenna types can thereby be used by means of a detachable connection on the node 1 or on the radio module 2. In this case, the present method is also suitable for finding the appropriate matching for each antenna type.

In addition, FIG. 2 shows schematically by way of example an object 18 in the vicinity of the antenna 3 of the radio module 2 at a distance A from the node 1 or from its antenna 3. For example, the object 18 may be a temporary object (parked vehicle, opened window or door) or a permanently present change in the surroundings (tampering with lasting effect or incorrect installation) that causes a change in the impedance of the antenna 3. The node 1 performs an estimate of the detuning of the antenna 3, and transmits to the data center 28 or Cloud, in addition to the sensor data SD, further data Z/DU relating to the detuning of the node 1 concerned.

Figure 3:
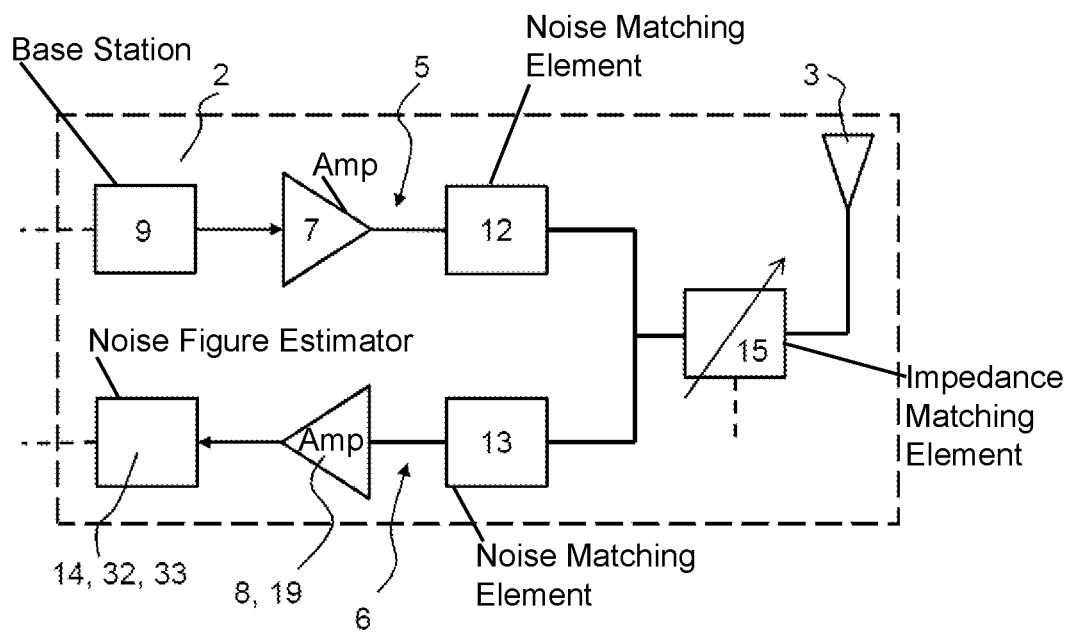
FIG. 3 is a highly simplified schematic diagram of a first example of a transmit path and receive path of the node in the communications network of FIG. 1.

FIG. 3 shows in a highly simplified schematic form an example variant of the transmit path 5 and receive path 6 of the radio module 2 of the node 1 shown in FIG. 2. The transmit path 5 contains a TX modulation element 9 for modulating, for instance, the signals originating from the sensor (not shown in FIG. 3), a PA or power amplifier 7, and a matching element 12, which achieves, for instance, a match to 50 Ohms, for example. The receive path 6 likewise comprises a corresponding matching element 13, for instance likewise having 50 Ohm matching, and an amplifier, for instance an LNA 8 (low noise amplifier) and/or an RF front-end 19, for amplifying the signals received via the antenna 3.

The receive path 6 may also contain an impedance estimator, an SNR estimator 32 or noise-figure estimator 14, details of the way in which each works being given in German patent applications DE 102021102204.5 or DE 102021102208.8. Alternatively, the receive path 6 may also contain an RSSI estimator 33. The measurements required for the impedance estimate, SNR estimate, noise-figure estimate or RSSI estimate are performed in the receive path of the node 1 by the respective estimators 14, 32 and 33 preferably at, or after, the output of the RF front-end 19 or of the input amplifier or LNA 8.

Downstream of the antenna 3 may be a matching element 15 having a plurality of matchings or matching networks for selective multi-stage impedance matching of the input path 6, which comprises a plurality of selectively switchable impedances, as described in published, non-prosecuted German patent application DE 10 2016 010 045 A1, for example. Alternatively or additionally, other controllable elements that adjust the impedance, for instance voltage-controlled variable capacitances (e.g. varactor diodes), can also be used for this purpose. The impedance matching element 15 can preferably be controlled by the microprocessor 11. The impedance matching element 15 can also be implemented, for example, by means of fixed matching networks on a printed circuit board.

The node 1 is normally in sleep mode in order to save energy. In order to receive a receive signal, the node 1 opens a receive window, this being done by the microprocessor 11 enabling the receive path 6, i.e. switching the receive path to "receive". As soon as a receive signal is received from the base station 10 or from another transmitter (e.g. another node) via the antenna 3, the impedance Z0, Z1, Zn of the receive path 6 is changed successively by the matching element 15, and in the estimator 14, 32 or 33 is determined in each case the associated impedance, noise figure, the associated SNR ratio or the associated RSSI. Alternatively or additionally, changes in the aforementioned values can also be determined for this purpose. It is thereby possible to use the relevant estimator 14, 32, 33 to deduce the actual degree of detuning of the antenna 3 and hence to deduce a particular distance A (cf. FIG. 2) of an object from the antenna. It is hence possible to detect the surroundings, preferably the surroundings close to the node 1, without an additional sensor, and even to quantify distances.

In the estimator 14, 32, 33, it is also possible to select that matching by the matching element 15 that is most favorable for transmit and/or receive. This can then be used for the transmit mode and/or receive mode. For the configuration shown in FIG. 3, the adaptive matching of the impedance is the same. Thus in this case the impedance matching also applies to the transmit path 5 at the same time.

The impedance matching element 15 can be implemented, for example, by means of fixed matching networks on a printed circuit board.

Figure 4:
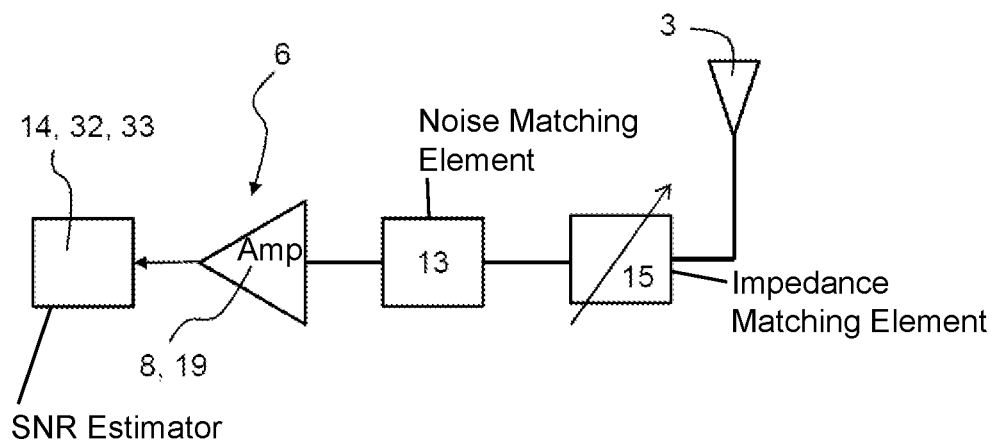
FIG. 4 is a highly simplified schematic diagram of a second example of a receive path of the node in the communications network of FIG. 1.

In the configuration of the receive path 6 shown in FIG. 4, the impedance matching element 15 is part of the receive path 6.

Figure 5:
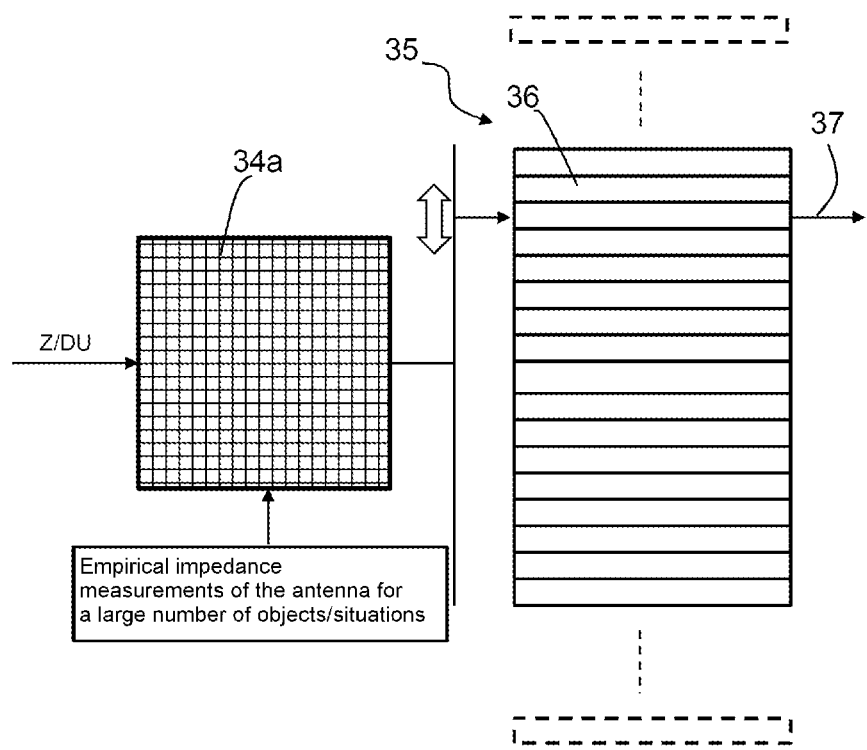
FIG. 5 is a highly simplified schematic diagram of using empirical data as an option for the association.

FIG. 5 shows a first option for using the data Z/DU, which is ascertained by the node 1 and relates to the detuning of the node 1, to detect the surroundings of the node. This is done by measuring in advance in the laboratory, i.e. empirically, the influence of different objects on the detuning of the antenna 3 of the node 1 on the basis of corresponding data (impedance, SNR, RSSI or noise figure), and storing this empirical data in a compare register 34*a* or lookup table. The incoming Z/DU values are compared with the contents of the compare register 34*a*, and a corresponding output 37 is generated on the basis of the result of the comparison, for instance by activation via a selection table 35 and a sub-routine 36 containing predetermined object information. The procedure checks how close the actual values lie to the predefined values. The association is then made on the basis thereof. For example, the output 37 may consist in illegal shielding having been detected at the meter. Impedances or impedance data stored in the compare register 34*a* are preferably specified according to their real part and imaginary part. In this case, a quantitative change in the impedance in the real part and imaginary part is placed in a suitable form in the compare register 34*a*. Then in the field, the measured impedance Z, or impedance change, or impedance data DU derived therefrom, is compared with the stored values. The measured value closest to the tabulated value identifies the object under measurement in the field, or the situation in the surroundings.

Figure 6:
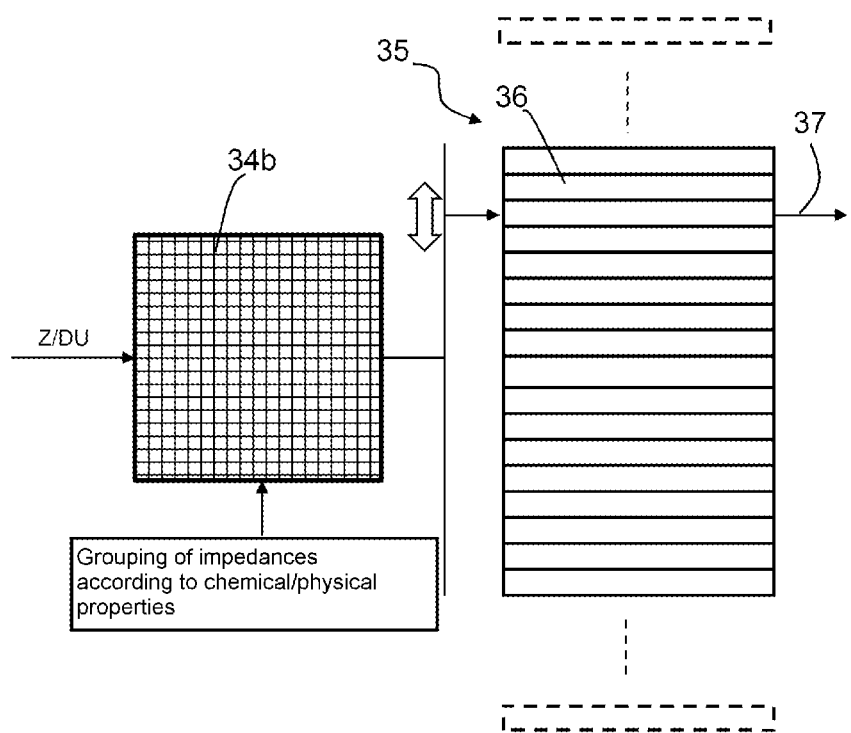
FIG. 6 is a highly simplified schematic diagram of using chemical or physical properties as an alternative option for the association.

FIG. 6 shows an alternative embodiment in which objects in the vicinity of the antenna can be grouped according to the chemical and/or physical properties of the objects on the basis of the influence on the impedance, in particular on the real and imaginary part thereof. For example, dielectrics (plastics) have the property of shifting the resonant frequency of an antenna, and therefore influence the imaginary part of the antenna impedance given a fixed measurement frequency. In contrast, metal parts have an attenuating effect and act on the antenna impedance such that they electrically shorten the typically present in nodes of the present type, and therefore increase the real part of low-impedance antennas. Appropriate comparison data is stored in the compare register 34*b*. The embodiment of FIG. 6 is otherwise the same as the embodiment of FIG. 5. Thus the embodiment shown in FIG. 6 can be used to deduce, on the basis of the type of effect of the property of the perturbation source, without prior measurement of objects in the laboratory, at least information relating to the material of the perturbation source.

The size (magnitude) of the measured effect on the antenna impedance can also be used to draw conclusions about the distance A of an object from the antenna 3; cf. FIG. 2.

The impedance of the antenna 3 of the node 1 is expediently checked at a time at which the connection of the node 1 to the base station 10 is being checked anyway for optimization purposes.

FIG. 7 shows a continuous uplink sequence of data packets 22*n*, 22(*n*+x), each of which contains, in addition to a header Hn, H(n+x) and tail Tn, T(n+x), a data area (payload), which normally contains the sensor data SDn, SD(n+x), but now according to the invention also contains additional data relating to the impedance of the antenna 3 (Z/DU), Z/DU(n+x). The relevant impedance data can thus be easily transferred as an additional "payload" in the uplink together with sensor data SD.

FIG. 8 shows in a diagram by way of example the occurrence of an event 1. An object, for instance, appears at this instant in time in the range of the antenna 3 of the node 1. The event can be ascertained, preferably even in real time if desired, and associated information can be output, or such a situation can be detected by the node and/or even the system. The temporary object is removed again at event 2. The temporary object may be, for example, the attempt to tamper with the node 1, for instance by opening the housing of the node 1 or by deliberately fitting shielding.

Figure 9:
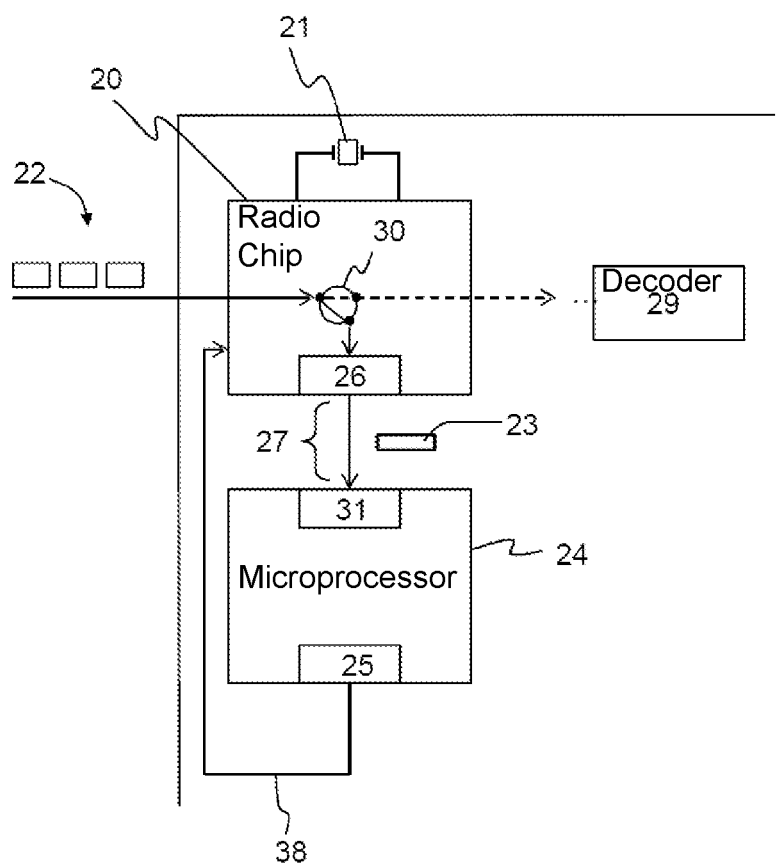
FIG. 9 is a highly simplified schematic diagram of a radio chip having an interface for providing I/Q data.

The detuning of the antenna for different matchings of the impedance can also be estimated digitally, as shown by way of example in FIG. 9. The analog input signals (data packets 22 or segments of data packets) are processed after the input in the receive apparatus or the radio chip 20 into digital or I/Q data, for instance by means of an I/Q technique (in-phase/quadrature technique). This can be done, for example, by splitting the analog input signal into two signal components, where one signal component is generated with the original phase (I data), and the other signal component is generated at a reference frequency shifted through 90°, for instance, (Q data). In this case, the digital data or I/Q data can be diverted out of the radio chip 20 or RF front-end 19, for instance by means of a switch 30, and fed via an interface 27 to a microcontroller 24. A power measurement (SNR, RSSI, noise figure) can be performed, for instance in the microcontroller 24, on the basis of the digital data 23 or I/Q data. The diverted digital data or digitized signals 23 are thus not decoded in the radio chip 20 or a downstream decoder 29 but are used to estimate the detuning of the antenna, in particular to ascertain the noise power or estimate the noise figure. The radio chip 20 has an antenna (not shown in FIG. 9), a clock generator (quartz) 21 and a digital filter 26.

The filter 26, which may be arranged on the radio chip 20 or on the microprocessor 24, can be used, for instance, to filter the data 23 and feed said data to a decimator 31. Here, a portion of the data is selected by means of an integer decimation factor, and finally used for ascertaining the antenna detuning. In addition, the microcontroller 24 can have a memory 25. The measured data, or data or information derived therefrom, can be conditioned in the microcontroller 24 for further processing, or can be fed back via a feedback channel 38 to the radio chip 20, in order that the appropriate matching can be established there. The individual functionalities can obviously also be combined in the radio chip 20.

The node can thereby use digital data (I/Q data), for instance within a data packet, to estimate the antenna detuning. In addition, the measured values, or values derived therefrom, can be compared with each other. The detection of the surroundings can be performed on the basis thereof. This way of estimating the antenna detuning is significantly faster and also considerably more flexible in how it is ascertained. The data that is not diverted is decoded in the decoder 29.

The method according to the invention allows effective detection of the surroundings of a node, for instance a sensor apparatus and/or actuator apparatus, capable of unidirectional or bidirectional radio communication, which detection manages without additional sensor technology and places only a moderate load on the power source for the node.

The following is a summary list of reference numerals and the corresponding structure used in the above description of the invention:

1 node
 2 radio module
 3 antenna
 4 power source
 5 transmit path
 6 receive path
 7 PA (power amplifier)
 8 LNA (low noise amplifier)
 9 base station
10 base station
11 microprocessor
12 noise matching element
13 noise matching element
14 noise-figure estimator
15 impedance matching element
16 memory
17 sensor element
18 object
19 RF front-end
20 radio chip
21 clock generator (quartz)
22 data packet
23 I/Q data
24 microprocessor
25 memory
26 filter
27 interface
28 data centre
29 decoder
30 switch
31 decimator
32 SNR estimator
33 RSSI estimator
34a compare register
34b compare register
35 selection table
36 subroutine
37 output
38 feedback channel
B material constituents
DU impedance data
E physical or chemical property
I situational information
SD sensor data
Z impedance
F noise figure

The invention claimed is:

1. A method for detecting surroundings of a node of a communications network, which comprises the steps of:

providing the node as being capable of unidirectional or bidirectional radio communication and having a radio module equipped with an antenna, a transmit path and/or a receive path, and a self-sufficient power supply apparatus configured to supply electrical power to the node for more than a year, wherein the node is at least one component selected from the group consisting of a sensor apparatus and an actuator;

obtaining an estimate of a detuning of the antenna by successively setting, at the node, a plurality of different matchings of an impedance of the antenna of the radio module; and detecting the surroundings on a basis of the estimate of the detuning of the antenna of the radio module.

2. The method according to claim 1, wherein the detuning of the antenna is estimated on a basis of ascertaining an impedance, a signal-to-noise ratio, a received signal strength indicator, and/or a noise figure in the receive path, at an output or after the output of an input amplifier or of a low noise amplifier of the receive path, or from digital signals or data or I/Q data in the receive path.

3. The method according to claim 2, which further comprises:

ascertaining, via the node, the impedance, the SNR, the RSSI and/or the noise figure in the receive path, at the output or after the output of the input amplifier or of the low noise amplifier of the receive path, or from the digital signals or the I/Q data in the receive path, and on a basis thereof performs the estimate of detuning of the antenna on a basis of a best-fit technique.

4. The method according to claim 2, which further comprises sending out by the node via the radio module information resulting from the estimate of the detuning of the antenna or from the ascertaining of the impedance, the SNR, the RSSI or the noise figure, or data derived therefrom.

5. The method according to claim 4, which further comprises receiving the information or the data sent out by the node by a base station and forwarded to a data center.

6. The method according to claim 4, wherein:

the information or data resulting from the estimate, or the data derived therefrom from a plurality of nodes of the communications network, is sent via at least one base station to a data center; and the information or the data resulting from the estimate, or the data derived therefrom, for each of the plurality of nodes is compared with each other and/or with stored data and/or combined with one another.

7. The method according to claim 4, which further comprises:

storing empirical comparison data relating to the information or the data, or data derived therefrom in a compare register;

comparing information or data determined during operation of the node, or data derived therefrom, with the empirical comparison data from the compare register; and identifying an object, or a situation in the surroundings, in a vicinity of the node or at least classified on a basis of the comparing step.

8. The method according to claim 4 wherein an object, or a situation in the surroundings, in a vicinity of the node is identified or at least classified on a basis of the information or the data, or data derived therefrom.

9. The method according to claim 2, which further comprises:

setting a plurality of different matchings of the impedance at the node;

determining or estimating the impedance, the SNR, the RSSI and/or the noise figure for each of the different matchings of the impedance in the receive path at the output or after the output of the input amplifier or the low noise amplifier of the receive path, or from the digital signals or the data or the I/Q data in the receive path; and comparing values determined in this way.

10. The method according to claim 9, which further comprises setting the plurality of different matchings of the impedance at the node by means of selectable matching circuits.

11. The method according to claim 2, which further comprises performing the estimate on a basis of the digital signals which is diverted from a main data stream in the receive path.

12. The method according to claim 1, which further comprises performing the estimate in real time.

13. The method according to claim 1, which further comprises performing the estimate as part of adjusting a quality of a radio transmission between the node and a base station.

14. The method according to claim 1, wherein the antenna is a narrowband antenna.

15. The method according to claim 14, wherein the antenna has a 3-dB bandwidth of less than 1 MHz.

16. The method according to claim 1, wherein a detection of the surroundings involves the following:
detecting parking-space occupancy, where an object causing the antenna detuning in particular is a vehicle;
tamper detection;
intrusion detection, where the object causing the antenna detuning is an opened window or an opened door;
detecting a level in a container, where the object causing the antenna detuning is material being added or emptied; or
detecting an incorrect installation.

17. The method according to claim 1, wherein:
the node is a sensor apparatus and/or an actuator apparatus; and
the surroundings are detected at repeated time intervals.

18. A node for use in a communications network, the node comprising:
a radio module having an antenna, a transmit path and/or receive path, a self-sufficient power supply apparatus configured to supply electrical power to the node for more than a year, and an impedance matching element for providing radio communications for the node; and
a microprocessor configured for obtaining an estimate of a detuning of the antenna by successively setting, at the node, a plurality of different matchings of an impedance of the antenna of the radio module, said microprocessor also configured for detecting the surroundings on a basis of the estimate of the detuning of the antenna of the radio module;
wherein the node is capable of unidirectional or bidirectional radio communication; and
wherein the node is at least one component selected from the group consisting of a sensor apparatus and an actuator.

19. The node according to claim 18, wherein:
said self-sufficient power supply apparatus is a battery.

* * * * *